Figure 3:
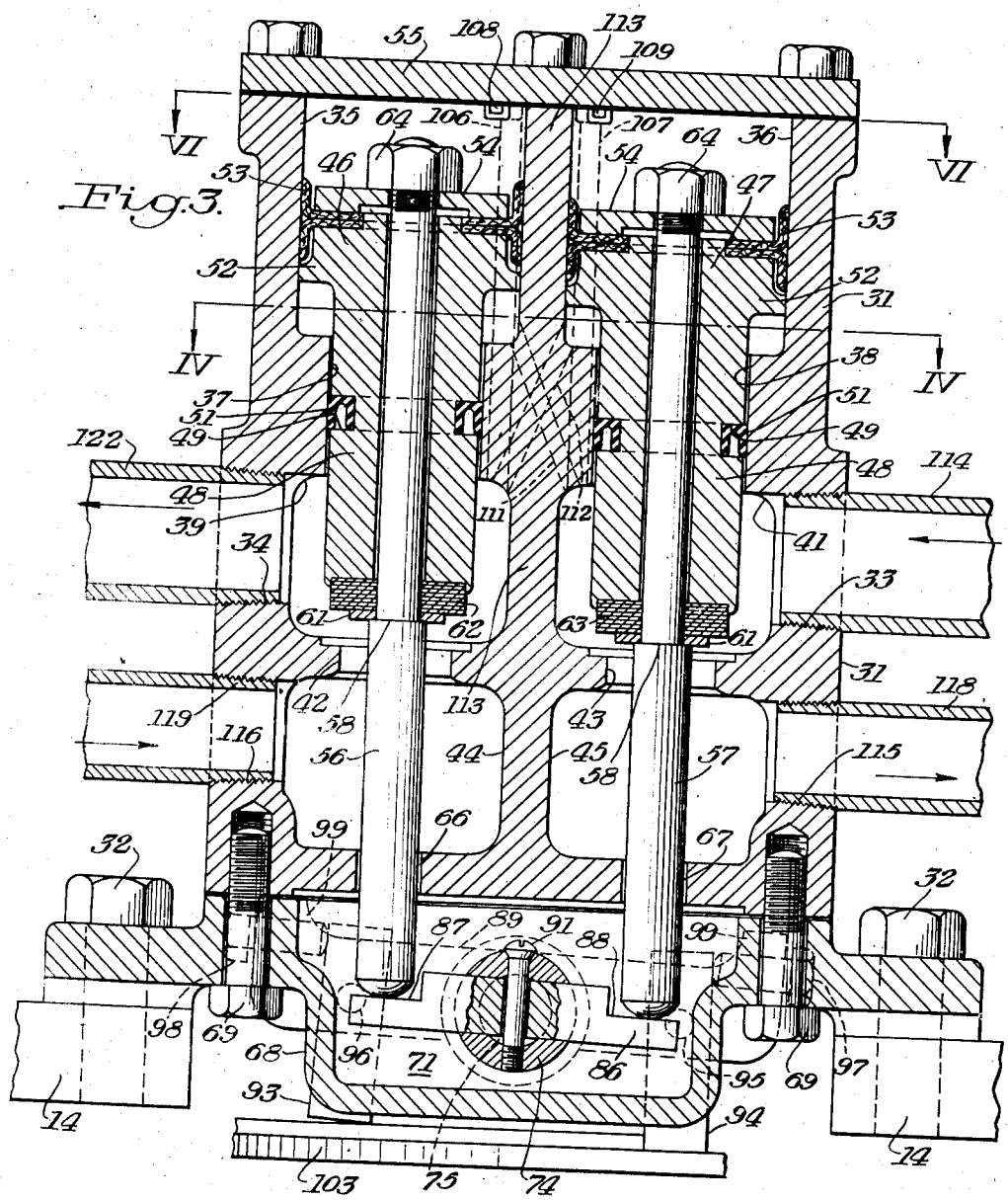

Oct. 14, 1941.  E. E. HEDENE  2,258,585
FLUID MOTOR CONTROLLED VALVE
Filed Jan. 4, 1938  4 Sheets-Sheet 1
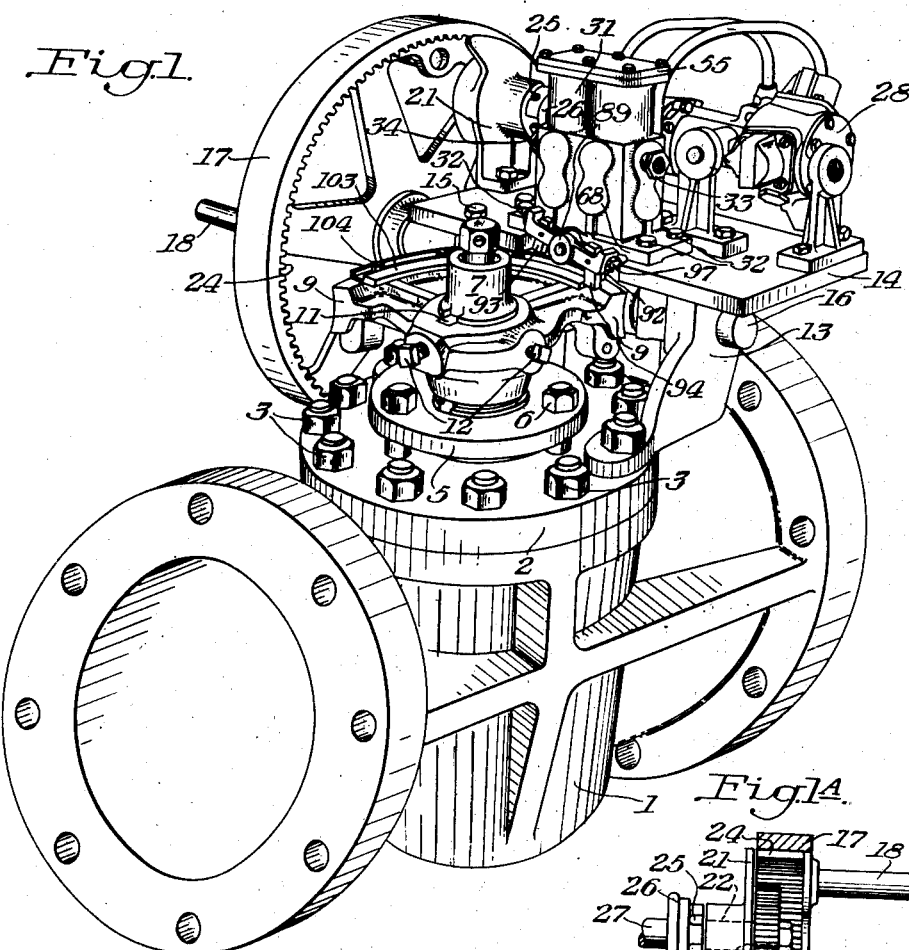
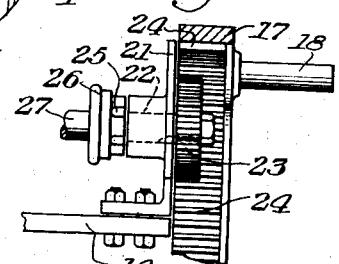
INVENTOR
Edwin E. Hedene.
BY
Lewis D. Konigsford
ATTORNEY Oct. 14, 1941.  E. E. HEDENE  2,258,585
FLUID MOTOR CONTROLLED VALVE
Filed Jan. 4, 1938  4 Sheets-Sheet 2
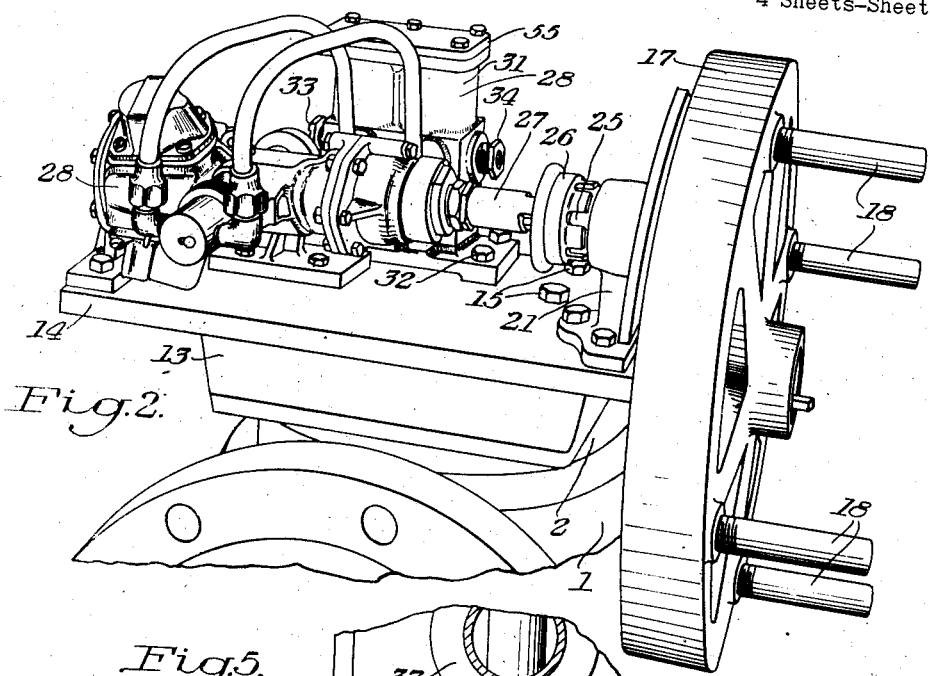
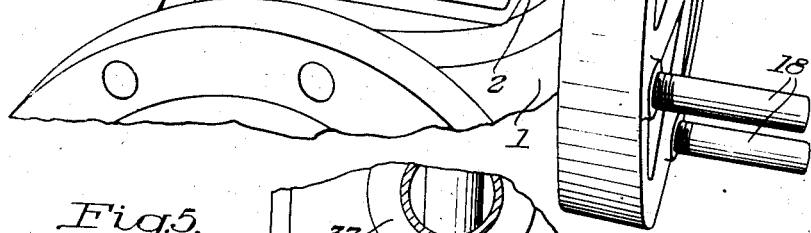
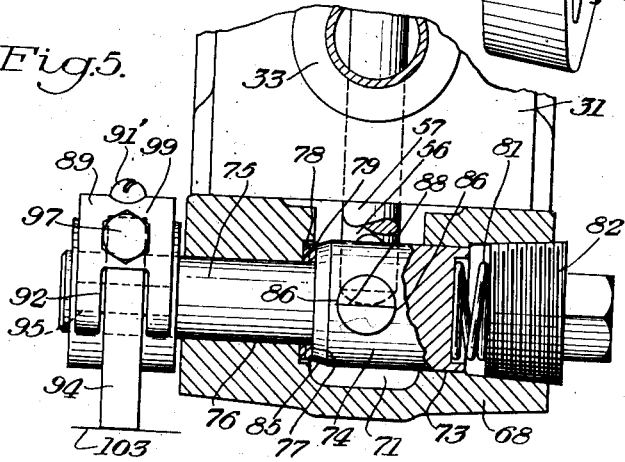
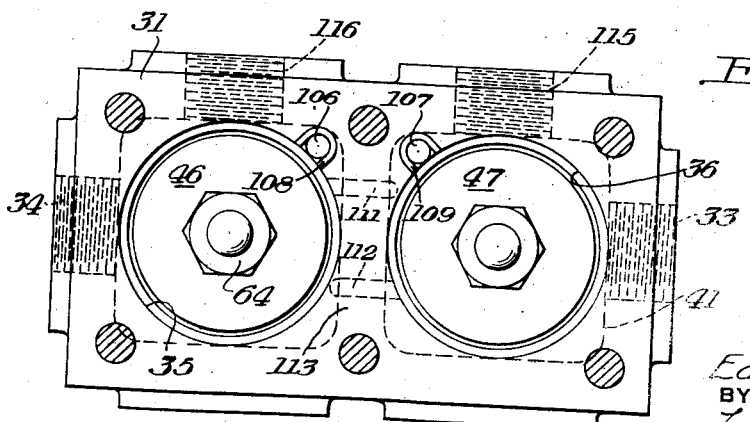
INVENTOR
Edwin E. Hedene.
BY
Lewis D. Koningsford
ATTORNEY Oct. 14, 1941.  E. E. HEDENE  2,258,585
FLUID MOTOR CONTROLLED VALVE
Filed Jan. 4, 1938 4 Sheets-Sheet 3

INVENTOR
Edwin E. Hedene.
BY
Lewis D. Konigsford
ATTORNEY

Oct. 14, 1941.  E. E. HEDENE  2,258,585
FLUID MOTOR CONTROLLED VALVE
Filed Jan. 4, 1938  4 Sheets-Sheet 4
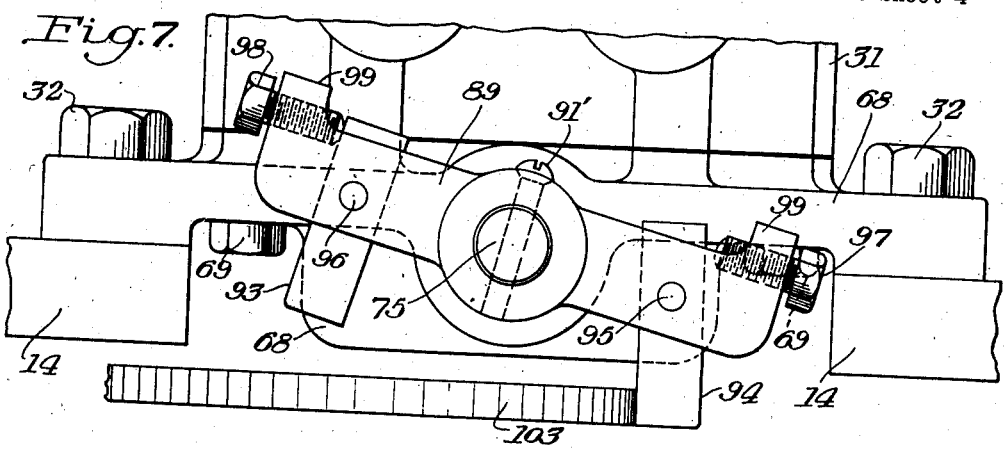
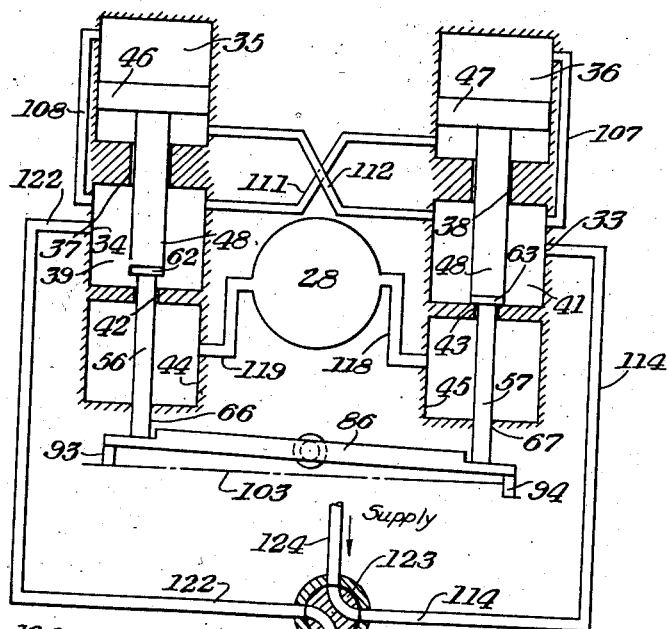
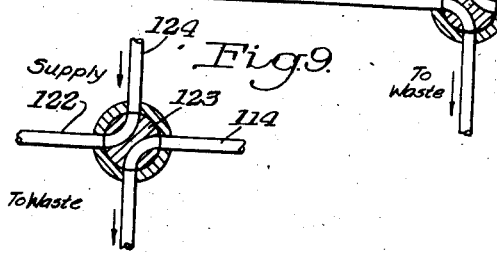
INVENTOR
Edwin E. Hedene.
BY
Lewis D. Kingsford
ATTORNEY Patented Oct. 14, 1941

2,258,585

UNITED STATES PATENT OFFICE 2,258,585

FLUID MOTOR CONTROLLED VALVE

Edwin E. Hedene, Oakland, Calif., assignor to Merco Nordstrom Valve Company, Pittsburgh, Pa., a corporation of Delaware Application January 4, 1938, Serial No. 183,313

23 Claims. (Cl. 137—139)

This invention relates to motor operated valves, and relates particularly to fluid operating and controlling mechanisms whereby such valves may be operated from a remote point by fluid pressure.

It is an object of the present invention to provide a fluid motor driven valve in which the supply fluid to the motor will be automatically shut off when the valve reaches full open or full closed positions.

A further object of the invention is the provision of a fluid motor driven valve, the direction of operation of which may be reversed when the valve is in any intermediate position.

A further object of the invention is the provision of a fluid motor driven valve which is governed by the pressure of the motor supply fluid to initiate operation of the motor when fluid pressure is supplied thereto.

A further object is to provision of a fluid motor controlled valve in which the motor control means is governed so as to automatically shut off at the end of the valve motion in opened or closed position and which in intermediate positions of the valve is maintained ready for operation in either direction.

A further object is the provision of a valve which may be operated manually or by a fluid pressure motor.

These and other objects of the invention will be apparent from a consideration of the following description and the accompanying drawings wherein is illustrated by way of example, a preferred embodiment of the invention and wherein:

Fig. 1 is a perspective view showing a valve in combination with the fluid motor operating mechanism, Fig. 1A is a fragmentary sectional view showing a part of the power transmission gearing, Fig. 2 is a perspective view taken from the rear of Fig. 1, certain parts of the valve being broken away.

Fig. 3 is a vertical section through the control mechanism, the inlet and outlet connections being transposed through ninety degrees to better illustrate the principle of operation, Fig. 4 is a transverse section taken on line IV—IV of Fig. 3, Fig. 5 is a sectional view of the bottom cover, Fig. 6 is a transverse section taken on line VI—VI of Fig. 3, Fig. 7 is an end view of a part of the limit mechanism with the valve at one limit of its rotation, Fig. 8 is a diagrammatical view illustrating the operation of the invention, and Fig. 9 is a diagrammatical view of the four-way valve in flow reversing position.

Referring to the drawings, wherein I have shown the invention applied to operating a plug valve of any suitable type, the valve comprises a casing 1 having a plug therein (not shown), and a cover 2 secured to the casing in any suitable manner, as by studs 3, a gland 5 being secured to the cover by bolts or studs 6. The plug has a stem 7 extending through the cover and gland, and has a worm wheel segment 9, the hub of which is keyed to the stem by a key 11 and is secured against axial movement by set screws 12. A bracket 13 is secured to the cover by the studs 3 and has a shelf 14 which carries the motor operating mechanism for the valve and the motor control mechanism. The bracket is bored to receive an operating worm shaft 16 journalled thereon and having a worm (not shown) meshing with the worm wheel segment 9. The hand wheel 17 is secured to one end of shaft 16 and has handles 18 thereon whereby the shaft 16 may be turned manually to open or close the valve.

The shelf 14 carries a bracket 21 at one end in which is journalled a shaft 22 (Fig. 1A) having a pinion 23 at one end which meshes with the internal gear teeth 24 of the hand wheel 17, and at its other end, shaft 22 has one portion 25 of a positive clutch of any suitable construction, the other portion 26 of the clutch being splined to shaft 27 to be longitudinally slidable thereon. Shaft 27 is rotated by a rotary fluid motor designated generally by the numeral 28. Any suitable type of fluid motor may be employed, such as a liquid or compressed gas motor, the specific motor illustrated being of the radial piston type driven by compressed air and including suitable reducing gearing in the casing.

From the construction so far described, it will be apparent that the valve may be operated by hand power upon disengaging the clutch members 25 and 26 and rotating wheel 17 by the handles 18 provided thereon which rotates the worm shaft 16 and worm segment 9 to rotate the plug. Or by engaging clutch members 25 and 26 and delivering energy to the motor 28, the shaft 27 will be rotated by the motor and through clutch members 25 and 26, shaft 22 and pinion 23 meshing with gear teeth 24, the mechanical power will be transmitted to shaft 16 to operate the valve.

The present invention embodies limiting mechanism and reverse mechanism whereby the operation of the motor ceases automatically when the valve reaches a predetermined position such as full open or full closed position, and whereby the direction of operation of the motor and valve may be reversed during operation before or after such predetermined position is reached. The type of motor employed is one in which the direction of rotation may be changed by reversing the inlet and outlet connections. A controller is provided comprising an outer casing 31 bolted to the shelf 14 by bolts 32 and has pipe connections 33 and 34 which arbitrarily are designated as inlet and outlet connections respectively. The casing 31 has flat portions on its four sides through any of which the inlet and outlet passages (and the re-entry passages hereinafter described) may be bored as convenient. The casing 31 has two cylinders 35 and 36 (Fig. 3) having reduced cylindrical bores 37 and 38 connecting cylinders 35 and 36 with substantially rectangular entrance or valve chambers 39 and 41 respectively. Valve chambers 39 and 41 communicate by valve passages 42 and 43 respectively with the re-entry chambers 44 and 45 respectively.

Pistons 46 and 47 are located in the cylinders 35 and 36, each piston comprising a shank 48 having a recess 49 therein to receive a packing ring 51, and an enlarged portion 52 having a packing 53 of leather, rubber, or other suitable material, secured in place by a head 54. The pistons carry control stems 56 and 57 which have the shoulders 58 thereon bearing against washers 61 and valve facings 62 and 63, the nuts 64 at the upper end of the stems 56 and 57 retaining the valve facings 62, 63, packing 53 and heads 54 in assembled position. A cover 55 closes the upper end of cylinders 35 and 36.

The lower ends of re-entry chambers 44 and 45 have the bores 66 and 67 through which extend the control stems 56 and 57 respectively with a loose fit. A bottom cover 68 is secured on the bottom of the controller by bolts 69 and provides a chamber 71 which communicates with re-entry chambers 44 and 45 by passages 66 and 67, but is sealed from the exterior. A wall of bottom cover 68 is bored at 73 (Fig. 5) to receive a close fitting rotatable cylindrical plug 74 having a rocker shaft 75 extending through the bore 76 in the opposite wall of bottom cover 68. The plug 74 and stem 75 form a shoulder 77 and a plurality of packing washers 78 are positioned on the stem between shoulder 77 and an abutting wall of recess 79, while a spring 81 held in position by a pipe plug 82 abuts the end of cylindrical plug 74 and holds it and washers 78 in sealing relation to abutment wall 79. The end of cylindrical plug 74 may be chamfered as indicated at 85 to allow the end of the plug to enter recess 79 without binding as the washers 78 become worn, and the chamber 71 may be filled with a heavy oil or with grease to assist in sealing shoulder 77, and lubricate the rocker shaft bearings.

Plug 74 is bored to receive a rocker arm 86 held in place by screw 91 and having flat ends 87 and 88 which are adapted to be engaged by the lower ends of control stems 56 and 57 respectively. The outer end of rocker shaft 75 carries a yoke 89 (Figs. 1, 3 and 7) secured thereon by a set screw 91', the yoke having its ends recessed at 92 and receiving followers or cam shoes 93 and 94 pivoted therein by pins 95 and 96. The ends of set screws 97 and 98 are threaded into the bridges 99 of the yoke and engage the upper ends of followers 93 and 94 to limit pivotal movement thereof. The end of stem 75 extends beyond the casing 31 and yoke 89 overhangs gear segment 9 (Fig. 1) which has a cam track 103 secured by bolts 104 to the upper side of the rim. The followers 93 and 94 are adapted to engage cam track 103 in certain positions of the valve for a purpose that will be hereinafter described and the set screws 97 and 98 provide a means for adjusting or timing the shoes 93 and 94 to drop off the cam track at the proper instant.

The dividing wall 113 has longitudinal passages 106 and 107 therein which terminate at their upper ends in horizontal passages 108 and 109 closed on one side by cover 55 and communicating at their ends with the cylinders 35 and 36 above pistons 46 and 47. Passages 106 and 107 connect at their lower ends with valve chambers 39 and 41. There are also two crossed passages 111 and 112 in wall 113, the passage 112 connecting valve chamber 41 with cylinder 35 below piston 46 and passage 111 connecting valve chamber 39 with cylinder 36 below piston 47.

The operation of the mechanism now will be described, with particular reference to Figs. 7, 8 and 9. It will be understood that the motor 28 is reversible by reversing the inlet and outlet connections, so that the inlet and outlet designations depend on the direction of operation.

In the diagram shown in Fig. 8, the controlled valve 1 is fully open, having just reached the limit of its movement in one direction. In this position cam 103 supports follower or shoe 93 which holds rocker arm 86 against the lower end of valve stem 56 thus holding valve 62 in open position so as to maintain valve passage 42 open. Cam shoe 94 is not resting on the cam 103 and valve 63 is closed by the pressure above piston 47, thus cutting off the fluid supply from pipe 114 to the motor. To open valve 1 four-way valve 123 is turned to the position shown in Fig. 9 to reverse the exhaust and supply sides so that fluid will flow from supply pipe 124 to inlet pipe 122 into inlet 34 and valve chamber 39 and thence by conduit 119 to motor 128.

As valve 63 (now in the exhaust line of the motor) is closed, no flow can occur through the motor 28 until this valve is opened. Fluid pressure from chamber 39 is conducted by passage 111 to the space below the piston 47 to raise the piston and open valve 63, the passage 107 allowing fluid above the piston 47 to escape by conduit 107 into exhaust line 114. The opening of valve 63 starts the motor 28 in the proper direction to open valve 1, and cam 103 rides under shoe 94 to bring the yoke 89 and rocker arm 86 to substantially horizontal position as shown in Fig. 3. At the same time fluid is conducted from high pressure chamber 39 through passages 108 into the cylinder 35 above piston 46, and as the fluid below piston 46 is conducted by conduit 112 into chamber 41 thence by pipe 114 to waste, the greater pressure above piston 46 tends to close valve 62, this action being prevented by cam shoe 93 riding on cam 103 and holding rocker arm in the position shown in Fig. 8. The motor 28 rotates shaft 27 coupled to shaft 22 which in turn, through pinion 23 and ring gear 24 rotates the worm on operating shaft 16, and this worm meshing with worm segment 9 rotates the valve.

While the valve 1 is in intermediate position, pistons 46 and 47 are elevated and valves 62 and 63 are open. Fluid pressure above piston 46 tends to close the valve 62, but closing of this valve is prevented by the shoe 93 riding on cam 103. The tendency of fluid pressure beneath piston 47 is to maintain the valve 63 open. When the controlled valve 1 reaches the closed position, the end of cam 103 is brought to shoe 93 so that the shoe 93 can drop off the edge of the cam so that the pressure in chamber 35 above the piston 46 forces the valve 62 against its seat to cut off the supply pressure to the motor and thus stop the operation of the motor. The downward movement of rod 56 rocks the rocker arm 86 causing the right end of the arm to rise against rod 57, thus maintaining valve 63 in open position. In this position shoe 94 is over the cam 103 and prevents closing of the valve 63, even though the pressure above piston 47 may become greater than the pressure beneath the piston. To reverse the controlled valve the supply valve 123 is turned to the position shown in Fig. 8, so that fluid under pressure is supplied through pipe 114 to chamber 41, thence through valve opening 43 to chamber 45 by conduit 118 to the motor. The valve 62 is opened by fluid pressure from chamber 41 which is conducted through conduit 112 to the cylinder beneath piston 46 to raise this piston and open valve 62, the fluid above piston 46 escaping through conduit 108 and chamber 39 to exhaust pipe 122. As soon as the main valve has started to rotate, cam 103 is moved underneath followers 93 and 94 so that the fluid pressure exerted through conduit 107 above piston 47 can not close valve 63.

If it is desired to reverse the valve 1 before the end of its movement, four-way valve 123 is turned to the opposite position, for example, as shown in Fig. 8 to reverse the direction of flow of fluid through the motor. Referring to Fig. 3, fluid now enters chamber 41 by inlet 33 and passes through valve opening 43 into chamber 45 and thence through pipe 118 to the fluid motor 28, thence by conduit 119 into re-entry chamber 44 and by valve opening 42 into chamber 39 thence by exhaust passage 34 and pipe 122 to waste. The pressure of fluid in chamber 39 now is less than the pressure of the fluid in chamber 41. Fluid is conducted from chamber 41 through passages 107 into the cylinder 36 above piston 47, and fluid from the low pressure chamber 39 is conducted by diagonal passage 112 to the space beneath the piston 47. As the pressure above piston 47 is higher than the pressure beneath the piston, the tendency of the pressure will be to force piston 47 downward and thus maintain control rod 57 in contact with the end of rod 86, the downward motion of the control rod 57 being limited by the follower 94 abutting the cam 103. The tendency of pressure above piston 47 therefore is to urge valve member 63 into its seat, and when the valve 1 reaches full open position, the shoe 94 drops off the cam 103, allowing valve 63 to close and shut off the fluid supply to the motor 28.

The present construction avoids the use of springs for opening or closing valves 62 and 63. The exact position of the cam 103 relative to cam shoes 93 and 94 can be determined by adjustment of screws 96 and 97. Also the pivotal support for shoes 93 and 94 allows these shoes to rock about their pivots to permit cam 103 to pass underneath without danger of locking or galling. If desired, electrical switches may be connected to be operated by rocker shaft 75 so that a red light will be illuminated when the valve is fully opened, a green light when it is fully closed, and both lights when the valve is in intermediate positions.

What I claim and desire to secure by Letters Patent is:

1. The combination comprising a controlled valve, a fluid pressure motor adapted to operate said valve, an inlet valve, conduits subjecting said inlet valve to the differential inlet and exhaust pressures of the motor to urge said inlet valve into closed position, a retaining member to prevent closing of the inlet valve, and means actuated by the controlled valve for releasing said retaining member when the controlled valve reaches the end of its movement to allow the differential pressure to close the inlet valve.

2. The combination comprising a controlled valve, a fluid motor for rotating said valve, and a fluid motor control mechanism comprising a control valve between the fluid supply and the motor, a second control valve in the exhaust line, said valves being subject to the differential fluid pressure between the motor inlet and motor exhaust, a cam operated upon rotation of said controlled valve, a pair of cam shoes adapted to ride on said cam, and a retaining member co-operating with said shoes and engaging said control valves.

3. The combination comprising a controlled valve, a fluid pressure motor for operating said valve, differential pressure control valves interposed in the motor supply and motor exhaust lines respectively, a conduit connected to urge the inlet control valve into closed position by fluid pressure, a retaining member preventing closing of the inlet valve, means actuated by the controlled valve for releasing said retaining member when the controlled valve reaches the end of its movement, and means for maintaining the exhaust valve in open position.

4. A valve operating mechanism comprising a controlled valve, a fluid motor for operating said valve, differential pressure operated control valves in the motor supply and motor exhaust lines respectively, conduits inversely connecting said control valves whereby the inlet control valve is urged into closed position and the exhaust control valve is urged into open position, a retaining member for maintaining the inlet valve in open position, means for releasing said retaining means when the controlled valve reaches its extreme position, and means preventing closing of the exhaust valve when the controlled valve reaches its extreme position.

5. The combination comprising a controlled valve, a fluid pressure motor for operating said valve, differential pressure control valves interposed in the motor supply and motor exhaust lines respectively, a retaining means preventing closing of said control valves when the controlled valve is in intermediate position, differential pressure means to close the inlet valve when the controlled valve reaches one extreme position, and means for reversing the differential pressure for opening the inlet valve when the direction of flow to the motor is reversed.

6. The combination comprising a controlled valve, a fluid motor for operating said valve, differential pressure operated control valves in the motor supply and motor exhaust lines respectively, conduits inversely connected said control valves to the motor inlet and exhaust lines whereby the inlet control valve is urged into closed position and the exhaust control valve is urged into open position, means to prevent closing of said valves when the controlled valve is in intermediate position, means for releasing said inlet valve when the controlled valve reaches full open or full closed positions, and means for reversing the direction of fluid supply to said motor.

7. In a motor control valve, a valve casing, a valve member in said casing having an operating stem extending therefrom, a segmental worm wheel connected to rotate with said stem, a cam track secured to said worm segment, a yoke carrying cam shoes pivotally secured thereto adjacent its extremity, adjustable means for limiting pivotal movement of said cam shoes, a fluid control motor connected to rotate said worm segment, differential pressure control valves located in the supply and exhaust lines respectively of said motor, conduits inversely connecting said valve whereby the inlet valve is urged into closed position and the outlet valve is urged into open position, and a retaining member connected to said yoke held in position by said cam and shoes to prevent closing of the inlet valve.

8. A controller member comprising a casing having inlet and outlet connections and re-entry connections, a pair of cylinders in said casing, pistons in said cylinders, valves for controlling said inlet and outlet connections and connected to said pistons, crossed channels inversely connecting said inlet and outlet connections with said cylinders, channels on one side of said pistons directly connecting said inlet and outlet to said cylinders on the other side of said piston respectively, retaining means for preventing closing of said valves, and means for releasing said retaining means to allow closing of one valve.

9. The combination comprising a controlled valve, a fluid pressure motor for operating said valve, a casing connected in the fluid line of said motor, a plurality of control valves in said casing, one valve being in the inlet line of the motor and the other in the exhaust line of the motor, re-entry connections in said casing to and from said motor, a pair of cylinders in said casing, pistons in said cylinders connected to said control valves respectively, conduits connecting said inlet and outlet to one side of said pistons respectively, cross channels reversely connecting said inlet and outlet connections with the cylinders on the other sides of said pistons, a rocker shaft, a rocker arm carried by said shaft and preventing closing of said control valves when the controlled valve is in intermediate position, a yoke carried by said rocker shaft, cam shoes adjustably carried on said yoke, a cam secured to said valve member and co-operating with said shoes, the cam being of such length that when the valve reaches full open or full closed positions, one of the cam shoes is released to allow closing of the inlet valve.

10. A control member comprising a casing having inlet and outlet connections and re-entry connections, said casing having a plurality of compartments therein, fluid pressure responsive means in said compartments, valve passages connecting said inlet and outlet with the re-entry connections respectively, control valves for controlling said valve passages and connected to said fluid pressure responsive means, channels whereby the fluid pressure responsive means connected to the inlet valve is subject to a differential pressure tending to open the same, valve control stems extending through said casing, a cover for said casing, a rocker shaft journalled in said cover, means for sealing said rocker shaft to prevent escape of fluid around said shaft, a rocker arm carried by said shaft and engaging said valve stems, a cam shoe carrier secured to said rocker shaft exterior of the casing, cam shoes carried by said carrier, and a cam operated by said controlled valve co-operating with said cam shoes to prevent closing of the inlet valve.

11. The combination comprising a controlled valve, a fluid pressure motor for operating said valve, a casing connected in the fluid line of said motor, a plurality of control valves in said casing, one valve being in the inlet line of the motor and the other in the exhaust line of the motor, re-entry connections in said casing to and from said motor, a pair of compartments in said casing, fluid pressure responsive means in said compartments connected to said control valves respectively, conduits connecting said inlet and outlet to one side of said pressure responsive means respectively, cross channels reversely connecting said inlet and outlet connections with the other sides of said pressure reponsive means, detent means preventing closing of said control valves when the controlled valve is in intermediate position, and means actuated when the controlled valve reaches its limit of movement to release said detent means from one of said control valves.

12. A controlling member comprising a casing having inlet and outlet connections and re-entry chambers, re-entry connections for said re-entry chambers, valve passages between said inlet and outlet connections and said re-entry chambers respectively, control valves for controlling said valve passages, fluid pressure responsive means connected to said control valves, control stems on said valves extending through said casing, a cover for said casing, a rocker shaft journalled in said cover having an enlarged cylindrical portion forming a shoulder with said shaft, a sealing washer adjacent said shoulder, a spring urging said shoulder against said washer, and a rocker arm on said shaft engaging said control stems.

13. A motor operating mechanism comprising a controlled valve, a fluid motor for operating said valve, differential pressure responsive controlled valves connected to the motor supply and motor exhaust lines respectively, fluid pressure actuated means urging the supply control valve into closed position and the exhaust control valve into open position, a retaining member for maintaining the supply valve in open position during operation of the motor in one direction, means for releasing said retaining means when the controlled valve reaches its extreme position to allow the differential pressure to act on said first mentioned means to close the supply valve, means preventing closing of the exhaust valve when the controlled valve reaches its extreme position, whereby upon reversal of the motor supply and exhaust lines the supply valve will be opened by differential pressure acting on said first mentioned means.

14. In a motor control valve, a valve casing, a valve member in said casing having an operating stem extending therefrom, a segmental worm wheel connected to rotate with said stem, a cam track rotated with said valve, a bar carrying cam shoes pivotally secured thereto adjacent its extremity, a fluid control motor connected to rotate said worm segment, differential pressure control valves located in the supply and exhaust lines respectively of said motor, the inlet valve being urged into closed position and the outlet valve being urged into open position by the differential pressure thereon, retaining means held in position by said cam and shoes to prevent closing of the inlet valve, and means to reverse the flow through said control valves.

15. In a motor control valve, a valve casing, a valve member in said casing having an operating stem extending therefrom, a fluid controlled motor connected to operate said stem, a cam track operated with said valve, a bar carrying cam shoes pivotally secured thereto adjacent its extremity, differential pressure control valves located in the supply and exhaust lines respectively of said motor, the inlet valve being urged into open position by the differential pressures thereon, retaining means held in position by said cam and shoes to prevent closing of the inlet valve and means to reverse the flow through said control valves.

16. In a motor control valve, a valve casing, a valve member in said casing having an operating stem extending therefrom, a fluid controlled motor connected to operate said stem, a cam member operated with said valve, a cam shoe member co-operating with said cam, differential pressure control valves located in the supply and exhaust lines respectively of said motor, the inlet valve being urged into closed position, and the outlet valve being urged into open position by the differential pressures thereon, retaining means held in position by said cam and cam shoe member to prevent closing of the inlet valve and means to reverse the flow through said control valves.

17. A controller member comprising a casing having inlet and outlet connections and re-entry connections, pressure responsive means, valves for controlling said inlet and outlet connections and connected to said pressure responsive means, crossed channels inversely connecting said inlet and outlet connections with said pressure responsive means, channels on one side of said pressure responsive means directly connecting said inlet and outlet to said pressure responsive means on the other side of said pressure responsive means respectively, retaining means for preventing closing of said valves, and means for releasing said retaining means to allow closing of one valve.

18. The combination comprising a controlled valve, a fluid pressure motor for operating said valve, a casing connected in the fluid line of said motor, a plurality of control valves in said casing, one valve being in the inlet line of the motor and the other in the exhaust line of the motor, re-entry connections in said casing to and from said motor, a pair of chambers in said casing, pressure responsive means in said chambers connected to said control valves respectively, conduits connecting said inlet and outlet to one side of said pressure responsive means respectively, cross channels reversely connecting said inlet and outlet connections with the chambers on the other sides of said pressure responsive means, a rocker shaft, a rocker arm carried by said shaft and preventing closing of said control valves when the controlled valve is in intermediate position, a bar carried by said rocker shaft, cam shoes adjustably carried on said bar, a cam secured to said valve member and co-operating with said shoes, the cam being of such length that when the valve reaches full open or full closed positions, one of the cam shoes is released to allow closing of the inlet valve.

19. The combination comprising a controlled valve, a fluid pressure motor for operating said valve, control valves interposed in the motor supply and exhaust lines and responsive to the pressure difference between inlet and exhaust of said motor, a conduit connected to urge the inlet control valve into closed position by fluid pressure, a retaining member preventing closing of the inlet valve, means actuated by the controlled valve for releasing said retaining member when the controlled valve reaches the end of its movement, and means for maintaining the exhaust valve in open position.

20. The combination comprising a controlled valve, a fluid pressure motor for operating said valve, control valves responsive to the pressure difference between inlet and exhaust of said motor and interposed in the motor supply and motor exhaust lines, retaining means preventing closing of said control valves when the controlled valve is in intermediate position, means to close the inlet valve when the controlled valve reaches on extreme position, and fluid pressure means for opening the inlet valve when the direction of flow to the motor is reversed.

21. A valve operating mechanism comprising a controlled valve, a fluid motor for operating said valve, control valves responsive to the pressure difference between inlet and exhaust of said motor and connected to the motor supply and motor exhaust lines, whereby the supply control valve is urged into closed position and the exhaust control valve is urged into open position, a retaining member for maintaining the supply valve in open position during operation of the motor in one direction, means for releasing said retaining means when the controlled valve reaches its extreme position to allow the differential pressure to close the supply valve, means preventing closing of the exhaust valve when the controlled valve reaches its extreme position, whereby upon reversal of the motor supply and exhaust lines the supply valve will be opened by differential pressure.

22. The combination comprising a controlled valve, a fluid motor to operate said valve, conduits for fluid supply to and exhaust from said motor, a valve for reversing the direction of flow in said conduits, a limit control member common to said conduits, and means on said controlled valve governing the operation of said member to shut off the fluid supply conduit.

23. A member for the control of fluid flow under pressure comprising a casing, fluid passages within said casing, valves in said casing arranged in series to control the flow in said passages, separate fluid pressure responsive means connected to each of said valves, means for applying the fluid pressure from said passages to said responsive means to bias the valves in opposite directions, and means movable into engagement with said valves to control their position.

EDWIN E. HEDENE.

CERTIFICATE OF CORRECTION.

Patent No. 2,258,585.　　　　　　　　　　　　　October 14, 1941.

EDWIN E. HEDENE.

It is hereby certified that error appears in the printed specification of the above numbered patent requiring correction as follows: Page 1, first column, line 20, for "to" read --the--; page 3, second column, line 64, claim 6, for "connected" read --connecting--; page 5, second column, line 23, claim 20, for "on" read --one--; and that the said Letters Patent should be read with this correction therein that the same may conform to the record of the case in the Patent Office.

Signed and sealed this 10th day of February, A. D. 1942.

Henry Van Arsdale,
(Seal)　　　　　　　　　　　　　　　　Acting Commissioner of Patents.